United States Patent [19]

Swager

[11] 4,204,233

[45] May 20, 1980

[54] ELECTRONIC FACET ERROR CORRECTION FOR LASER SCANNING

[75] Inventor: Gary E. Swager, San Jose, Calif.

[73] Assignee: Xerox Corporation, Stamford, Conn.

[21] Appl. No.: 847,372

[22] Filed: Oct. 31, 1977

[51] Int. Cl.$^2$ .............................................. H04N 1/04
[52] U.S. Cl. ................................................... 358/293
[58] Field of Search ............... 358/199, 206, 256, 280, 358/264, 285, 293, 230, 296; 350/6, 7; 346/108

[56] References Cited

U.S. PATENT DOCUMENTS

| | | | |
|---|---|---|---|
| 3,848,087 | 11/1974 | Carrell | 358/264 |
| 3,867,751 | 2/1975 | Starkweather et al. | 358/256 |
| 3,938,191 | 2/1976 | Jarmy | 346/108 |
| 4,000,368 | 12/1976 | Tisue | 358/285 |
| 4,002,830 | 1/1977 | Brown et al. | 358/293 |
| 4,037,231 | 7/1977 | Broyles et al. | 358/256 |

Primary Examiner—Robert L. Griffin
Assistant Examiner—Joseph A. Orsino, Jr.

[57] ABSTRACT

A system for changing the rate of a bit clock based on errors of individual facets of a rotating polygon utilized in laser scanning system, the errors that exist between facets causing the velocity of the scan associated with the facet to be different from other scans. Facet erros are detected initially by having a start of scan pulse initiate a bit clock counter which counts the clock pulses generated by a voltage controlled oscillator. The counter provides an output to an interval detector when a desired total bit count for a scan line is reached. At some time with respect to the counter output an end of scan pulse is generated. The interval between the counter output and the end of scan pulse is the error for a particular facet.

Logic allows memory locations to be addressed and loaded with the errors produced by the remaining facets in sequence, the sequence being continually repeated as the polygon rotates. During the time between the end of scan and start of scan pulses for a scan line, the error for the next facet is read out of memory to a digital to analog converter, which changes the frequency of the voltage controlled oscillator. If the error indicates the scan velocity is slow for the next facet, the oscillator frequency is reduced. If the error indicates the scanned velocity is fast for the next facet, the oscillator frequency is increased.

6 Claims, 6 Drawing Figures

ELECTRONIC FACET ERROR CORRECTION FOR LASER SCANNING

BACKGROUND OF THE INVENTION

In recent years, laser scanning techniques have been developed in the prior art in which information is transmitted to a scanned medium by modulating light from a laser in accordance with a signal, such as a video signal, which corresponds to the information to be reproduced on the scanned medium. For example, U.S. Pat. No. 3,867,571 discloses a flying spot scanning system which utilizes light from a multifaceted rotating polygon which is then directed to the scanned medium. A light source illuminates at least one of the facets during each scanning cycle to provide the spot scan. In each scanning cycle information is transmitted to the scanned medium by modulating the light from the light source in accordance with a video signal. In order to avoid the variation of the spot velocity at the focal plane of the spot due to the convolution of optical elements utilized in the system, the number of binary digits in the video signal transmitted to the modulator is varied. A function generator, whose output is the approximation of the predicted spot velocity throughout a scan line is coupled to a variable frequency clock generator which in turn is coupled to a digital device for varying the number of bits per second in accordance with a predetermined function to transmit the bit stream at a given rate synchronous with the velocity of the spot. The purpose is to control the video data rate which is applied to the modulator so as to be proportional to the spot velocity so that the resulting image on the scanned medium is not distorted.

The spot velocity correction technique described in the aforementioned patent is based upon velocity errors due to the optical components utilized and implies that the velocity error will be constant for each scanline. However, velocity variations in a scanning system of the type discribed can also be caused by errors in individual polygon facets which are differences in radius and angularity of the polygon from facet to facet which then may require a different correction signal for each scanning facet. U.S. Pat. No. 3,573,849 describes a technique for making the scan velocity of the writing beam across a photosensitive medium uniform by utilizing a scanning lens which has a varying focal length. This patent also utilizes a coding beam to maintain synchronism between the writing beam modulation and writing beam scan such that each information bit modulates the writing beam at the proper instant, with respect to the writing beam scan. However, the use of a coding plate to generate the coding beam and the use of the variable focal length scanning lens makes this technique relatively costly.

Therefore, what is desired is a facet error correction system for use in laser scanning applications which corrects for errors associated with each facet on the rotating polygon which is accurate and relatively inexpensive. One possible solution to the aforementioned problem is to use a polygon which is accurately machined in a manner where the facet errors are virtually eliminated. However, this would be extremely costly and would cost ineffective in products which may incorporate the laser scanning system as discussed above. The use of grating clock type systems as, for example, disclosed in the aforementioned U.S. Pat. No. 3,573,849, is also relatively costly.

SUMMARY OF THE PRESENT INVENTION

The present invention provides a system for changing the rate of a bit clock based on errors of individual facets of a rotating polygon utilized in laser scanning system, the errors that exist between facets causing the velocity of the scan associated with that facet to be different from other scans. Facet errors are detected initially by having a start of scan pulse initiate a bit clock counter which starts counting the clock pulses generated by a voltage controlled oscillator. The counter provides an output to an interval detector when a count corresponding to the desired total bit count for a scan line is reached. At some time with respect to the counter output (before, after or at the same time as the counter output) an end of scan pulse is generated. The interval between the counter output and the end of scan pulse is the error for a particular facet and is represented as a binary number. This interval is added to the contents of a memory location for that facet. Logic associated with the memory allows memory locations to be addressed and loaded with the errors produced by the remaining facets in sequence, the sequence being continually repeated as the polygon rotates. Error correction may be accomplished by using a digital to analog converter coupled to the voltage controlled oscillator. During the time between the end of scan and start of scan pulses for a scan line, the error for the next facet is read out of memory to the digital to analog converter. The output of the digital analog converter changes the frequency of the voltage controlled oscillator. If the error indicates that the scan velocity is slow for the next facet the frequency of the oscillator is reduced. If the error indicates that the scanned velocity is fast for the next facet, the oscillator frequency is increased. In this manner the proper number of bits are clocked out between the start of scan and end of scan pulse for each scan line so that information is imposed on the scan line at precise intervals to avoid the possibility of image distortion.

It is an object of the present invention to provide a scanning system wherein information is imposed on each scan line at precise intervals in accordance with the output of a variable clock generator.

It is a further object of the present invention to provide a laser scanning system which utilizes a multifaceted rotating polygon to scan the laser beam across a scanline and wherein information is imposed on each scanline at precise intervals in accordance with the output of a variable clock generator, the output of said clock generator being controlled in a manner wherein velocity variations in the scanning beam due to facet errors are compensated.

It is still a further object of the present invention to provide an electronic system which continually detects and corrects for variations in the velocity of a laser scanning beam due to facet errors such that information can be imposed on each scanline at precise intervals.

DESCRIPTION OF THE DRAWINGS

For a better understanding of the invention as well as other objects and further features thereof, reference is made to the following description which is to be read in conjunction with the following drawing wherein.

DESCRIPTION OF THE PREFERRED EMBODIMENT

Figures 1, 2:
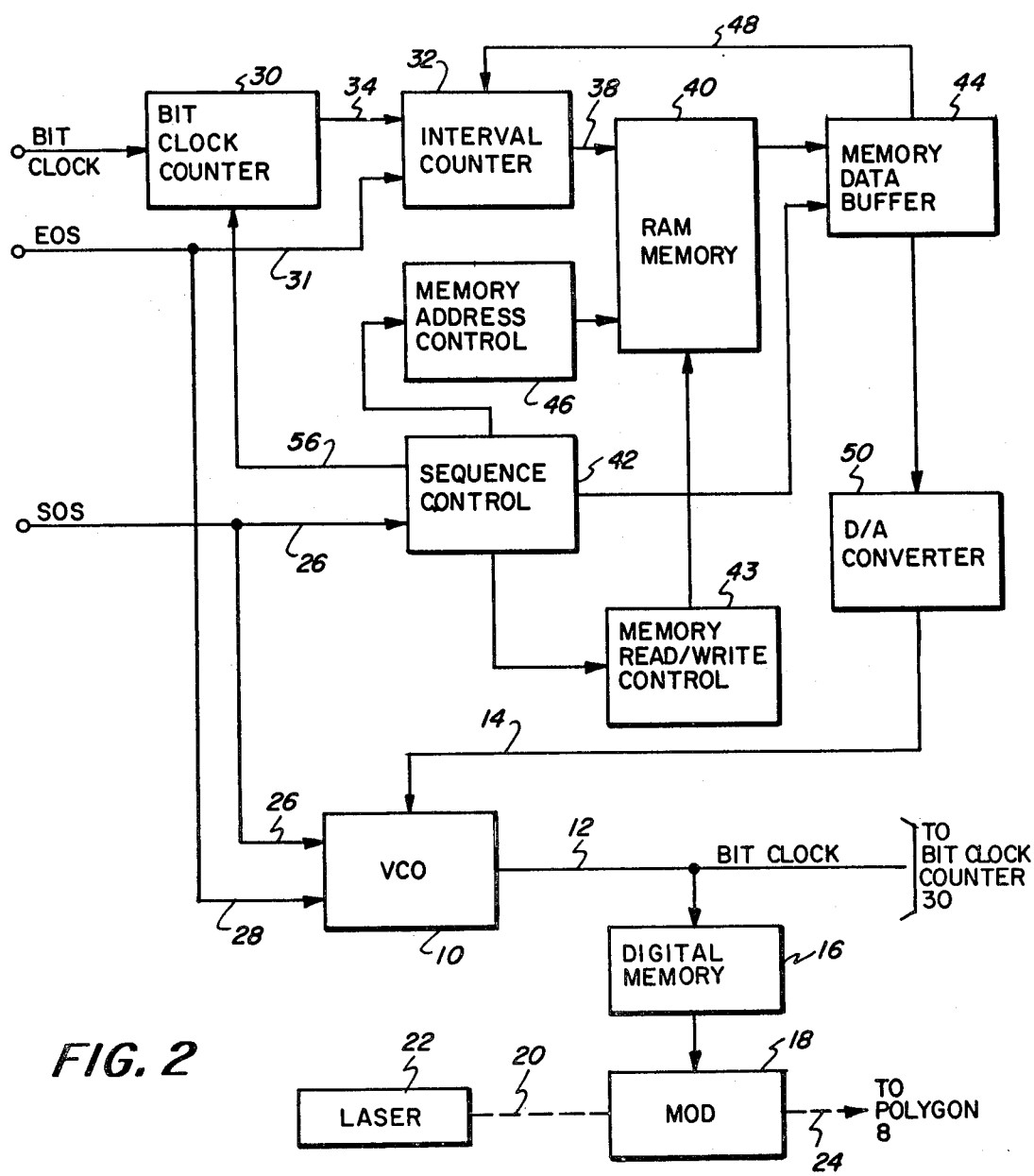
FIG. 1 illustrates a rotating multifaceted polygon which may be utilized in the present invention.
FIG. 2 is a block diagram of the present invention.

As set forth hereinabove, U.S. Pat. No. 3,867,571 discloses a prior art system which utilizes a rotating multifaceted polygon member to cause a laser beam to scan across a laser sensitive medium, such as a xerographic drum. The system includes electrical means for synchronizing the bit rate of the stream of binary bits which represent the information content of an electrical signal to the velocity of the beam as it scans across the medium, the synchronization means varying the number of bits per second in accordance with a predetermined function. Detector means are provided to indicate the start and end of a scan line. The present invention is designed to be utilized in the type of system disclosed in this patent and would, in essence, replace the function generator utilized therein. For the purposes of simplification, the specific details of U.S. Pat. No. 3,867,571 have not been set forth herein but is to be understood that the teachings of this patent necessary for an understanding of the present invention are incorporated herein by reference. In general, the rotating polygon 8 (as shown in FIG. 1) incorporates a plurality of reflecting facets 4,6 thereon, each facet producing a scan line across the surface of the medium as the polygon rotates in the direction of arrow 9. As set forth hereinabove, each facet may have errors associated with it which can cause image distortion when the image (either the actual image or a latent image) is formed on the laser sensitive medium. In particular, the variation in radius r1,r2, . . . between facets 4,6 . . . respectively will cause variations in the velocity of the scanning beam from scanline to scanline.

FIG. 1 is a block diagram of the present invention which detects and corrects facet errors such that information imposed on each scanline is accomplished at predetermined, precise intervals to produce an essentially distortion free image. A voltage controlled oscillator 10, corresponding to the variable frequency clock in the aforementioned patent, provides a serial bit stream on lead 12, called the bit clock, the frequency of which is dependent on the magnitude of the voltage applied thereto on lead 14. The output on lead 12 may be applied, for example, to a digital memory 16 of the type described in the aforementioned patent in order to clock out the information stored therein in precise intervals, the information in turn controlling a modulator 18 which modulates the laser beam 20 generated by laser 22 to form a modulated, precisely timed laser beam 24 which is directed to the rotating polygon and thereafter to a laser sensitive medium.

The bit clock divides the scan line so that information can be imposed on the scan line at precise intervals, the output of VCO 10 being initiated by a start of scan signal (SOS) on lead 26 and is stopped by an end of scan signal on (EOS) lead 28. The start of scan and end of scan signals can be generated by the technique described in the aforementioned patent, the generation of start of scan and end of scan signals being known in the prior art. If it is desired, for example, to print 400 bits per inch over 11 inches in the direction of scan produced by the rotation of polygon 8, 4400 pulses are required from the bit clock between the start of scan and end of scan pulses. By setting the VCO 10 to produce the desired pulse count and assuming that the beam scan velocity produced by each facet is equal, information read out from memory 16 will be imparted to the scan lines in precise intervals. However, if facet errors caused by differences in facet radius from facet to facet, the velocity of the beam which produces the scan line being proportional to the facet radius, the velocity of the scan associated with a facet of one radius will be different from the velocity of the scans associated with facets of different radius. If the facet error causes a scan velocity for a facet to be lower than the nominal bit clock rate, the information will be printed in a manner wherein it is shifted towards the start of scan. If the velocity of the facet is higher than the nominal bit clock rate set by the VCO 10, the scan line information will be shifted toward the end of the scan line. Since the bit clock is running at a constant frequency, a corresponding change in the number of clock pulses generated between the start of scan and end of scan will occur. The bit clock output is applied to a bit clock counter 30, the output of which is coupled to an interval counter 32 via lead 34. The end of scan signal is also applied to interval counter 32 via lead 36. Since VCO 10 is caused to start generating pulses by a start of scan signal on lead 26, the bit clock counter 30 starts counting pulses at that time also. The counter 30 provides an output on lead 34 to interval counter 32 when the desired count is reached. The VCO 10 is arranged to provide a desired printing frequency in the direction of scan. For example, if it is desired to print 400 bits per inch over 11 inches, this requires 4400 pulses from the VCO 10 at some time while the counter 30 is accumulating the desired count the end of scan occurs. In the normal operation (no facet errors), the output of counter 30 occurs at the same time that the end of scan is detected. If the time of occurrence is different, the interval between the two occurrences is a representation of the velocity error for that facet. The error on lead 38 is represented as an 8-bit binary number and is added to the contents of a memory location for that facet in RAM memory unit 40. However, sequence control device 42 causes memory data buffer 44 to provide an input on lead 48 to the interval counter 32 which corresponds to the previous stored error for that facet. When the end of scan signal arrives concurrently with the arrival of the count from bit clock counter 30, the signal on lead 48 is not modified by the interval counter and the input for RAM memory 40 on lead 38 will be the same as previously stored. If the end of scan signal and the count from the bit clock counter 30 have occurred, sequence control device 42 causes memory address control unit 46 to sequence the memory unit to the next facet location which normally is next in sequence from the memory location for the previous facet. During the time between the end of scan signal and the start of scan signal, the sequence controller 42 causes the memory 40 to sequentially change from a write mode to a read mode via memory read/write control 43, device 43 properly conditioning memory 40 for either read or write modes of operation, change the memory address to the next facet memory location and to cause memory data buffer 44 to provide the data from RAM memory 40 to the interval counter 32 and to digital to analog converter 50. The output of the digital to analog converter 50 on lead 14 changes the frequency of the voltage controlled oscillator 10 to compensate for any velocity error for the particular scanning facet. Sequence control device 42 also resets the bit clock counter 30 to load in a number corresponding to the desired print rate (i.e., 4400 bits per scan line in the example) as shown in FIG. 3.

Figure 3A:
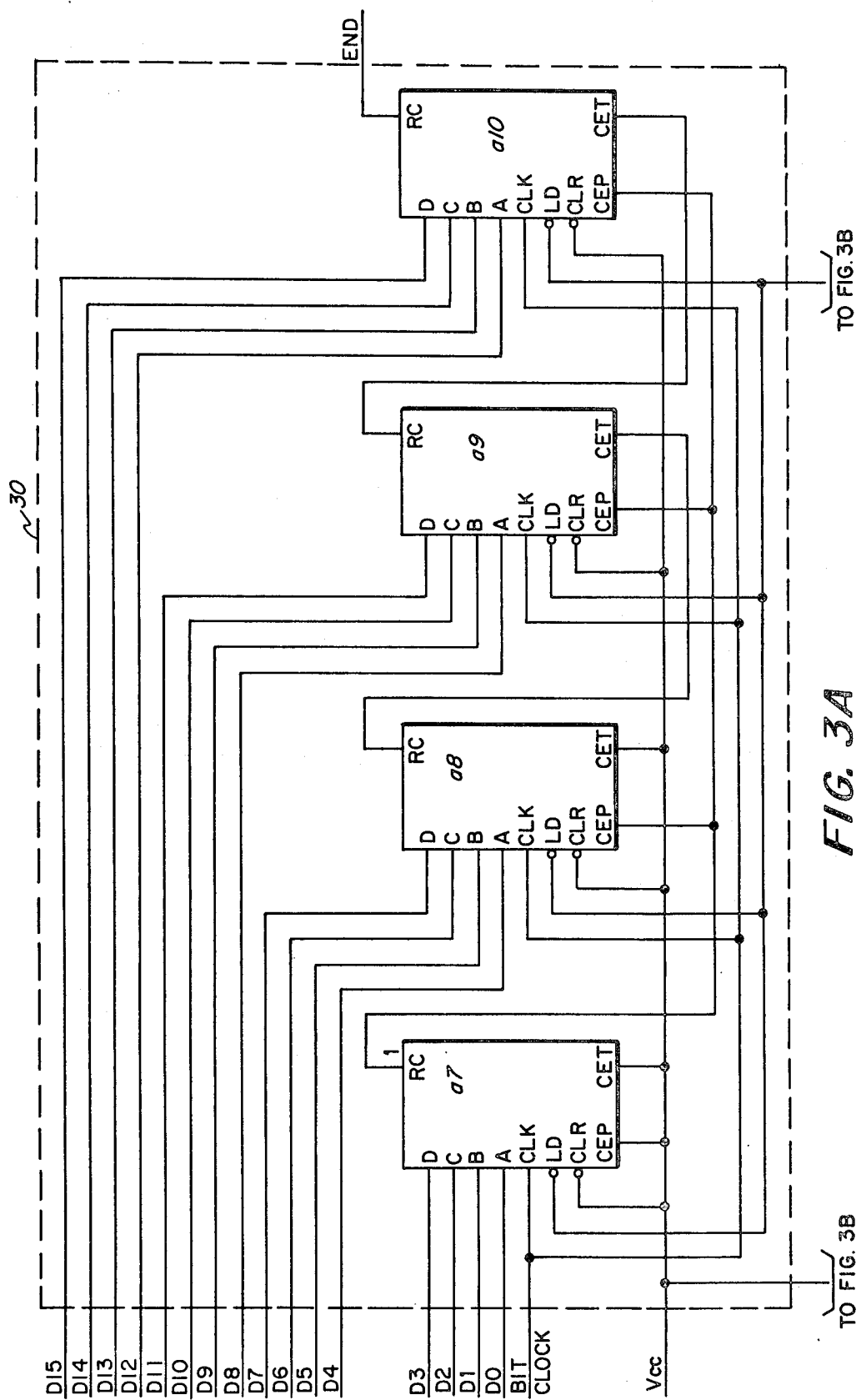
FIGS. 3-5 are logic diagrams corresponding to the block shown in FIG. 2.
Figure 3B:
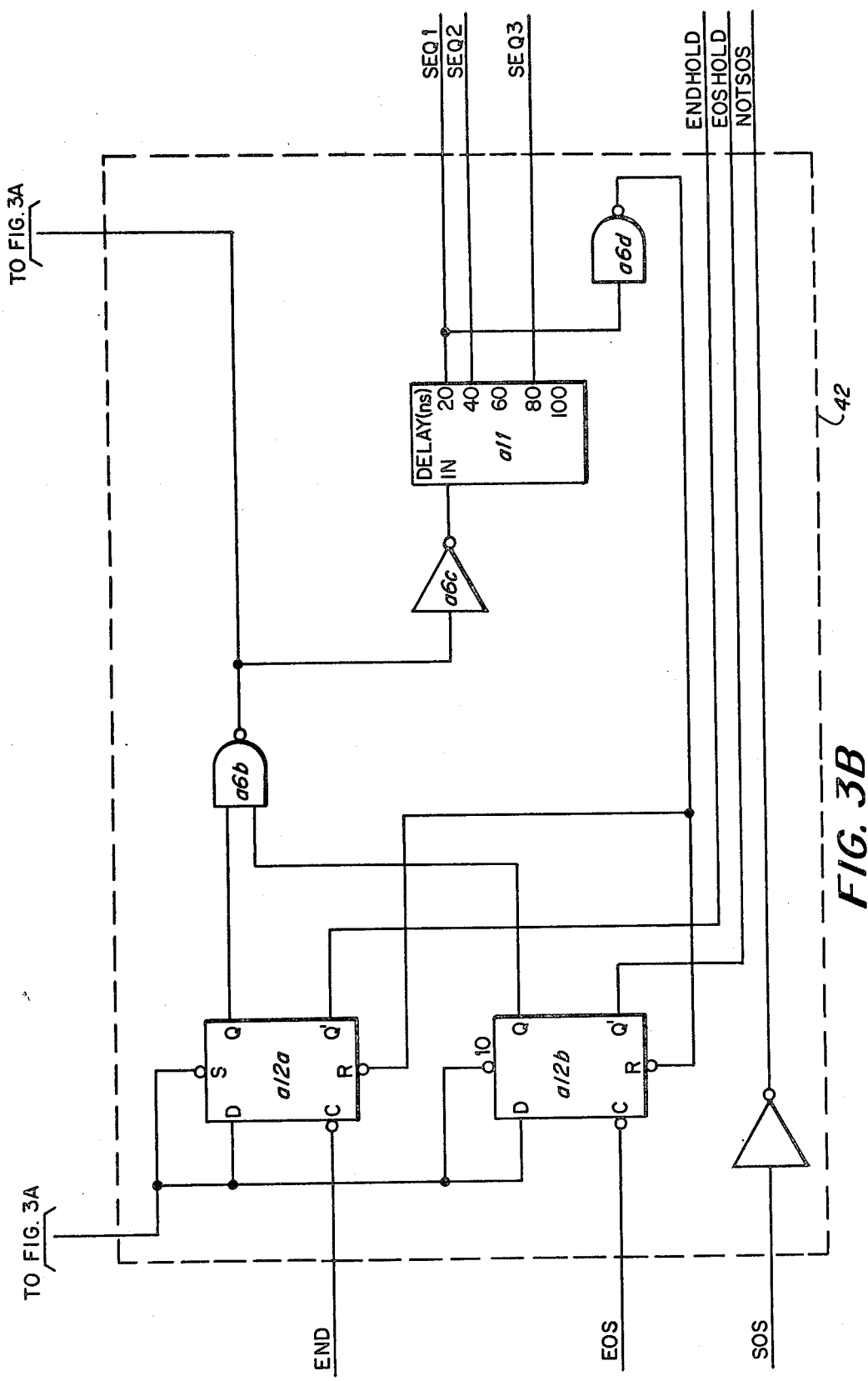
Figure 4:
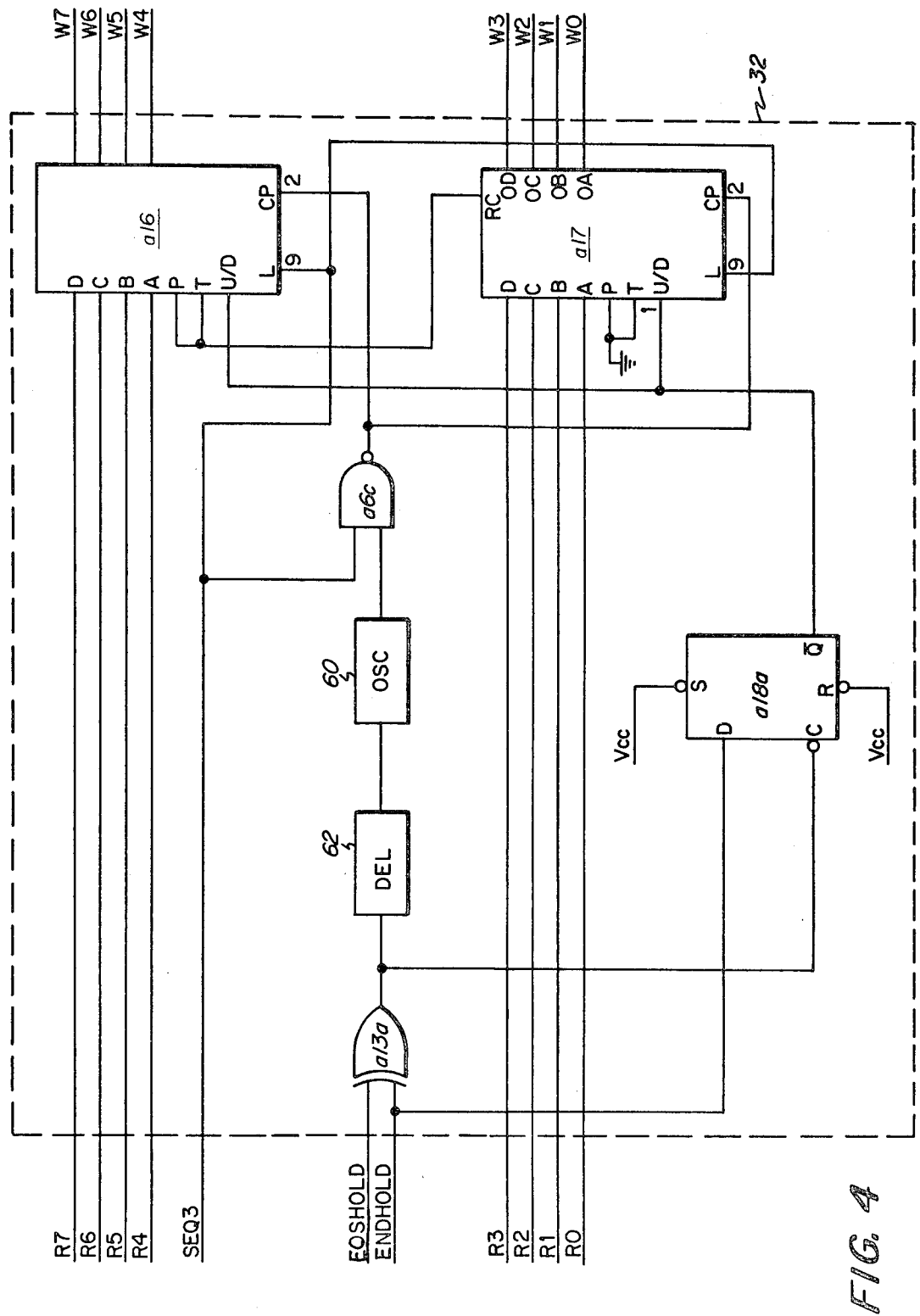
Figure 5A:
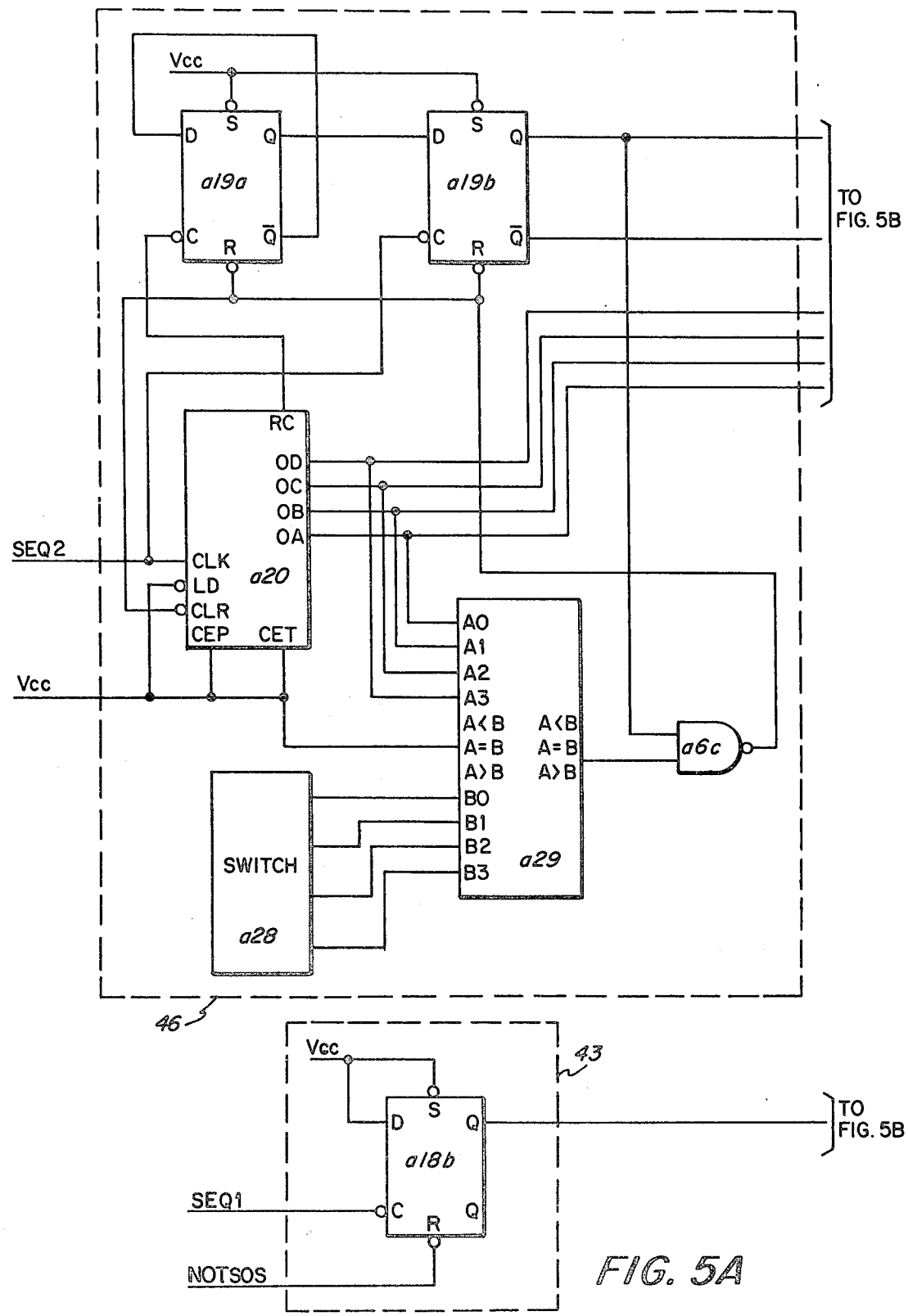
Figure 5B:
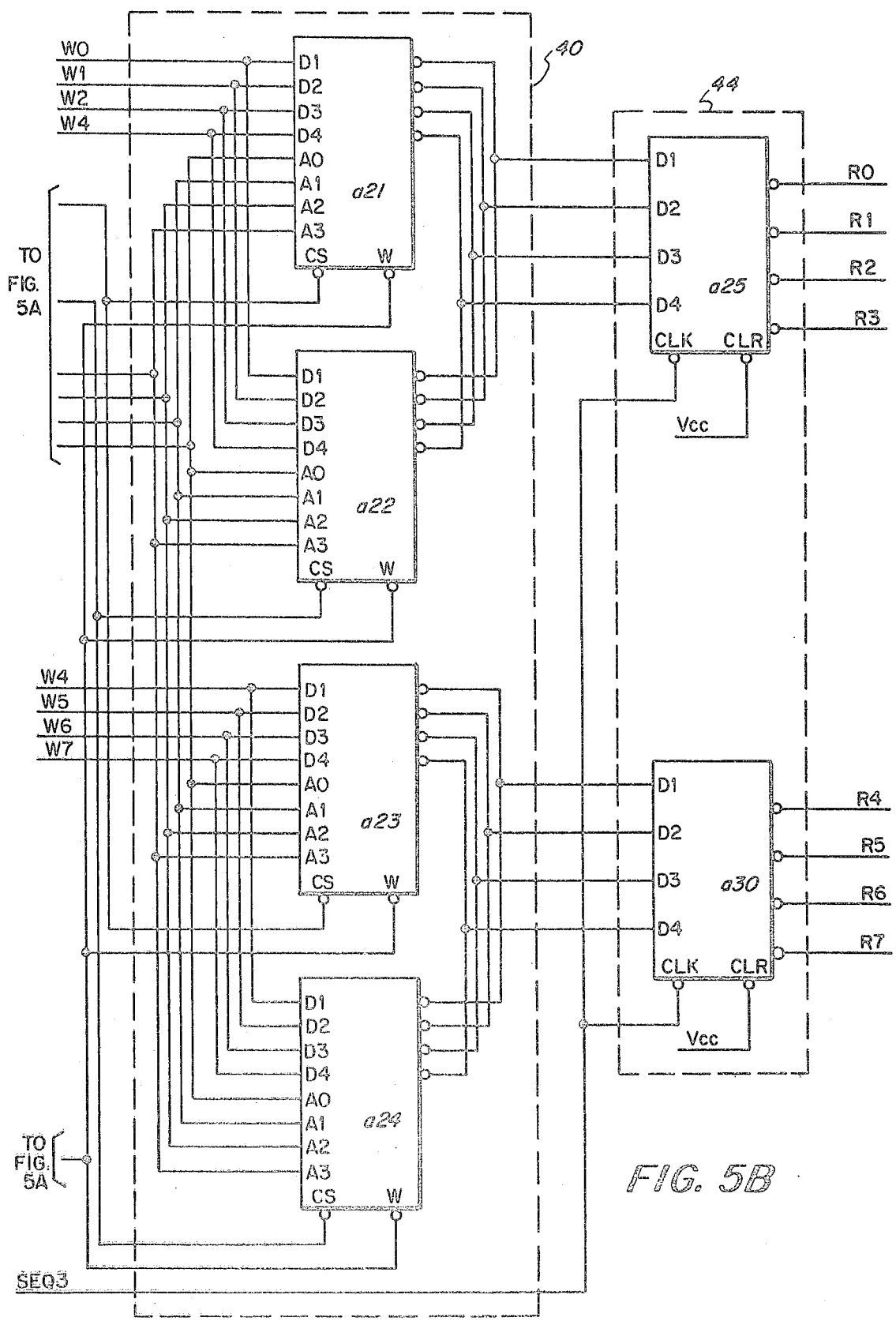
Figure 6:
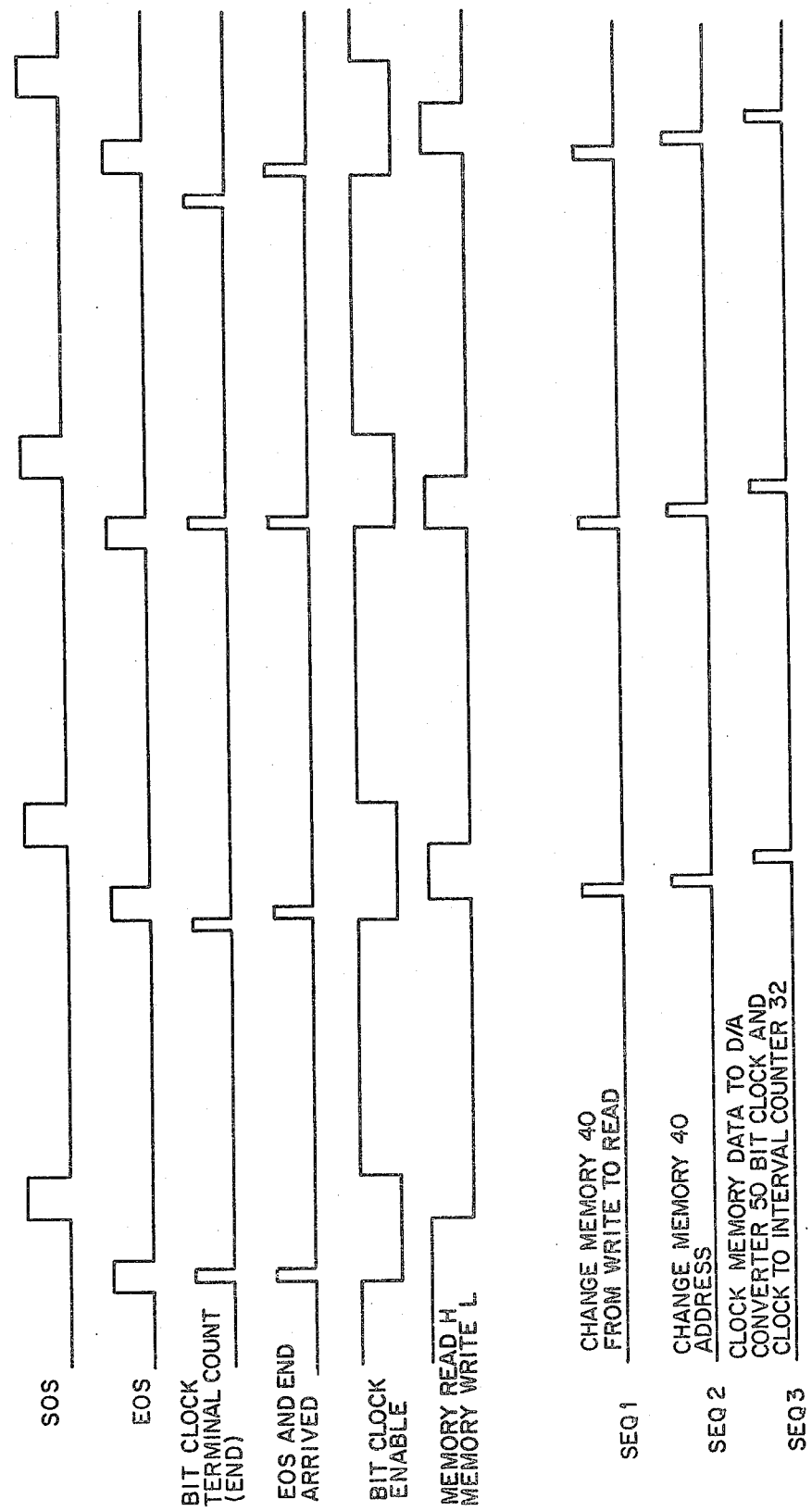
FIG. 6 is a simplified timing diagram for the system of the present invention.

FIGS. 3, 4 and 5 are logic diagrams of the bit counter logic and sequence control logic, the interval counter logic and the memory and memory control logic, respectively, which comprise portions of the present invention and FIG. 6 is a basic timing diagram therefor. The present invention, in general, takes an 8-bit error signal, for example, for a particular facet memory location and the next time that facet is ready to be utilized for scanning a laser beam across a scan line, that error signal is utilized to control (servo) the bit clock such that the output frequency thereat of corresponds to that required to compensate the system for velocity errors caused by that facet. That error signal is loaded into interval counter 32, the error signal being updated to reflect the current state of that facet, the detected error signal, in most situations, equaling the error signal read from memory once the scanning system is fully operative.

FIG. 3 is the logic diagram showing the bit clock counter 30 and sequence control device 42. The bit clock counter in the embodiment shown comprises chips a7–a10 which count up from the complement of the desired scan line print rate to provide the output (END) from the RC terminal of chip a10. For example, if it is desired to have a print rate of 4400 bits per second, the number 61,136 ($2^{16}$–4400) is set into the chips a7–a10 by switch means (not shown) via the 16 lines designated as D0–D15.

As the bit clock goes, the counters a7–a10 are caused to count. When the counter is full, "END" is generated, at the output RC of counter a10. The pulse signals END and EOS are applied to the C inputs of the flip-flops a12a and a12b, respectively. When either END or EOS arrives, the interval counter a16 and a17 (shown in FIG. 4) is caused to count. When the other one arrives, the interval counter is disabled. Further, when END occurs, a12a is clocked and when EOS arrives a12b is clocked. When both a12a and a12b are clocked, NAND gate a6b is enabled. The bit clock 30 at this time is disabled by a6b putting a low signal on the load lines LD of chips a7 through a10. The data inputs D0–D15 to the counter 30 simultaneously being clocked. NAND gate a6b also disables inverter a6c which causes a high signal to start rippling down delay line a11.

Sequence 1 is generated 20 nanoseconds after pulse is applied to the input to a11 and 20 nanoseconds thereafter sequence 2 is generated. Sequence 3 is generated 40 nanoseconds after sequence 2 to allow time for setting up system parameters. The output of NAND gate a6d (used as an inverter) resets flip-flops a12a and a12b at the occurrence of sequence 1, the outputs of a12a and a12b becoming low, which makes the output of a6b high, the input to a11 being low causing the sequence outputs to be in the form of pulses. Flip-flops a12a and a12b also generate END HOLD and EOS HOLD in a sequence determined by the time of arrival of EOS and END. In other words, END HOLD is generated first if END arrives first and EOS HOLD is generated first if EOS arrives first. Referring to FIG. 4, EOS HOLD and END HOLD are applied to oscillator 60 via exclusive OR gate a13a and delay means 62. The oscillator frequency is selected to provide an appropriate error correction count and may be selected to be four times the bit clock frequency of VCO 10 so that oscillator 60 will provide four counts for every bit generated by VCO 10. This would allow for error correction to one quarter of a bit clock.

The output of oscillator 60 is coupled to NAND gate a6c which controls the loading of counters a16 and a17 via the count pulse (CP) terminal. a16 and a17 are up-down counters that count the error between END and EOS as reflected by the output count of oscillator 60. Sequence 3 is utilized to clock the error signal R0–R7 to counters a16 and a17. If it is assumed that an error exists between the time when the bit clock counter generates END and when EOS occurs, EOS HOLD and END HOLD will also be produced at different time intervals. If END HOLD arrives first (a low signal for the logic utilized), EOS HOLD is high so that the output of exclusive OR a13a will also go high. It should be noted that since EOS HOLD and END HOLD do not occur at the same time if an error is present, the logic is arranged to generate a positive signal if EOS HOLD arrives first to cause counters a16 and a17 to count up and a negative signal if END HOLD arrives first to cause counters a16 and a17 to count down. Flip-flop a18a makes that determination and when END HOLD comes first, a logic "0" (low) is applied to the D input of a18a, the logic "1" (high) output of a13a clocking that low on the D input of a18a to the Q output thereof, the $\overline{Q}$ output having a low signal thereon. That low makes the counter a16 and a17 count in the down direction, causing the error signal R0–R7 to be decreased. If EOS HOLD arrives first, the opposite condition results. In particular, a high output appears at $\overline{Q}$ of a18a causing counters a16 and a17 to count in the up direction, increasing error signal R0–R7. Delay 62 is provided to allow flip-flop a18a sufficient time (i.e. 10 nanoseconds) to set counters a16 and a17 in the up or down mode of operation. When oscillator 60 is enabled, it starts counting, making a16 and a17 count up or down as set forth hereinabove. When the other pulse is received at the input of a13a, oscillator 60 is disabled and the count present on its output (W0-W7) is coupled to the inputs of memory chips a21–a24 (FIG. 5) so that the memory location for the facet whose error is being measured is applied to the memory inputs. Since the memory chips a21–a24 are in the WRITE mode, the error signal is written into that location. If EOS HOLD and END HOLD arrive at the exact same time, the same error signal for that facet is written into the selected memory as is read out of the selected memory. When the error is generated, the facet is being measured and the memory location for that facet is being held.

Referring to FIG. 5, memory chips a21 and a23 are used together to generate an 8-bit error signal and a22 and a24 are used together to generate an 8-bit error signal. The memory arrangement shown provides 16 words, corresponding to an error signal for 16 facets in memory chips a21 and a23 and 16 words, corresponding to an error signal for 16 additional facets in memory chips a22 and a24. From the description of the system operation in FIG. 4, a selected memory location has an error signal applied to its input which is written into memory. To protect that information, the selected memory chip is switched by flip-flop a18b in response to the sequence 1 pulse on its clock input. This is necessary since the system is to go to the next memory location and the present error signal from the interval counters is not to be applied to the next memory location which corresponds to a different facet memory location. The second sequence is received by counter a20 which clocks the counter in a manner wherein the next memory location in the selected memory pair is accessed. The output of this memory location corresponds to the next facet error signal. Sequence 3 then occurs and clocks memory buffers a25 and a30 so that information R0-R7 for the next facet is clocked out to the D/A converter 50 so that the clock frequency of VCO 10 can be changed the information also being applied on the inputs to interval counters a16 and a17. It should be noted that sequence 1 clocks the NOT SOS signal on the reset input of a18b to the Q output thereof to the read mode whereas the start of scan signal (the inverse of NOT SOS) changes the memory back from read to write. Therefore, the next time the interval is measured, the output from interval counters a16 and a17 will be applied to the next accessed memory location since the memory is in the write mode and when the next scan line is generated, the error associated with that facet is measured via the interval counters, the measured error is put into that memory location, the memory is placed in the read mode, the information in the next memory location is accessed and clocked out and the memory is changed to the write mode, the process being repeated continually as the rotating polygon 8 is rotated.

FIG. 6 is a simplified timing diagram for the logic diagram shown in FIGS. 3-5. In summary, if the first facet of rotating polygon 8 has already scanned a scanline across the laser sensitive medium, the next facet in sequence being referred to as facet 2, the period of time between the end of scan for the first facet (i.e. facet 1) and the start of scan for facet 2 is utilized by loading the interval counters a16 and a17 with the error signal stored in the memory location corresponding to facet 2, the output of the interval counters a16 and a17 initially corresponding to the facet 2 error signal. Assume that facet 2 has started to scan. Whether the interval counters a16 and a17 are caused to count up or down to increase or decrease the error signal is dependent upon whether END HOLD or EOS HOLD is detected first. Assuming that the oscillator 60 is running fast and END HOLD comes first, the interval counters a16 and a17 would be caused to count up until EOS HOLD arrives. At this time, oscillator 60 is disabled, which indicates the new error signal appears at the output of the counters a16 and a17 as bits W0-W7 on the corresponding output leads. The error signal W0-W7 is applied to the selected RAM memories a21-a24 and, at the proper time, this 8 bits of error signal is loaded back into facet 2 memory location of the RAM memories. The memory is then indexed to the next memory location corresponding to facet 3, and then the facet 3 error appears as bits R0-R7 on the corresponding outputs of memory buffers a25 and a30. This process is repeated continually for all the facets which comprise the polygon scanner. If a mistake is made, i.e. an end of scan was not detected, a wrong error signal for that facet would be stored in memory. However, during the next error correction cycle for that facet, the system will adjust the stored error signal to the proper value, i.e. the error detection and system of the present invention is self-correcting. Logic gates a28 and a29 of FIG. 5 function as follows: For the memory configuration shown, there is sufficient storage for 8 bits of 32 words, 32 words corresponding to 32 facets as set forth hereinabove. If a 24 faceted polygon was utilized, after the 24th memory location it is required that the system return to memory location zero (0) instead of sequencing to memory location 25. Essentially, a29 is a comparator and when it reaches a count corresponding to the number of polygon facets (as determined by switch a28), the memory addressing logic comprising flip-flops a19a and a19b and counter a20 causes the RAM memory a21 to be addressed at facet location zero. This is accomplished by a signal at the output of NAND gate a6c which is applied to the CLR input of counter a20. After an EOS or END signal is received, the sequencing of the system begins. The initial sequence, sequence 1, makes the RAM memory 40 change from a write to a read mode after the error interval has been measured. The memory chips a21-a24 are arranged so that at one time chips a21 and a23 are selected to read out information, the four outputs from a21 (and a22) being coupled to memory buffer a25 and the four outputs from a23 (and a24) being coupled to memory buffer a30. For the second 16 memory locations, a22 and a24 are selected by the memory addressing logic and are utilized for writing and reading information. Flip-flops a19a and a19b switch between the two pairs of memories after sixteen memory locations, i.e. initially memory chips a21 and a23 are selected but on the seventeenth memory location memory chips a22 and a24 are selected by enabling their chip select (CS) lines.

Before sequence 1 arrives, a corrected error signal (W0-W7) is placed on the appropriate input lines of a21 and a23 or a22 and a24. It is desired to write this error signal into the memory location corresponding to the facet that just scanned and since the selected memory chips are in the write mode, this information is written into the particular memory location addressed. When sequence 1 arrives, flip-flop a18b is clocked and the selected memory chips are switched to the read mode enabling the error signal to be written into that memory location for the facet just passed. Sequence 2 then occurs and is applied to logic blocks A19b and a20 which indexes the memory chips to the next memory location in sequence (changes memory address) for the next facet coming up, the error signal thereat being as an input to memory buffers a25 and a30. Sequence 3 clocks a25 and a30 which clocks the error information for the next facet coming up to leads R0-R7, which as is shown in FIG. 2, is applied to digital analog converter 50 and also to interval counters a16 and a17. When the system is fully operational, the signal on leads R0-R7 should be the same each time unless there is a mistake in the logic, the system of the present invention being self-correcting. Since the system is self-correcting, it will take at least one complete revolution of the polygon scanner 8 to provide a proper facet error signal which is stored in the appropriate memory location.

Each memory chip, as shown, is organized into 16 words with 4 bits per word. However, by utilizing the logic arrangement shown, the chips are organized so that they provide 32 words of 8 bits per word. There is, therefore, room in memory for 32 facets as set forth hereinabove.

It should be noted that counter 20 is arranged to provide a 4-bit address to the selected memory chip, this address being changed every time sequence 2 is received. When a20 is full and attempts to recycle to zero, a19a and a19b change the chip select lines. This allows a20 to change the address for the second 16 words of memory in sequence, each word comprising 8 bits. When a20 gets full again, flip-flops a19a and a19b provides the appropriate chips selection whereby the first 16 by 8 bits of memory is enabled. As set forth hereinabove, switch a28 and gate a29 together function as a comparator having a threshold level associated therewith and recycles a20 to zero when less than 32 facets are utilized, i.e. less than the full complement of storage locations are utilized. Obviously, if for example, the polygon has 24 facets, a20 will be recycled to zero after the 24th facet has completed its scan. In this regard, portions of the logic shown in FIG. 5 could be eliminated if few facets were utilized. For example, if only 10 facets were utilized, logic elements a19a, a19b, and two of the memory chips (i.e. a22 and a24) could be eliminated.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. In a raster output scanner having source means for supplying a light beam which is intensity modulated in accordance with an information bearing electrical bit stream, a photosensitive recording medium, and a rotatably driven multifaceted beam scanning mechanism optically interposed between said source means and said recording medium for cyclically scanning said light beam across said recording medium to reproduce said information on said recording medium; the improvement comprising the combination of means for generating separate velocity error signals for said facets, each of said error signals representing any difference between the velocity at which said beam is scanned across said recording medium by a respective one of said facets and a predetermined reference velocity; and means for adjusting the bit rate of said bit stream on a facet-by-facet basis in response to said errors signals to provide a predetermined number of bits per scanning cycle despite any facet-to-facet scan velocity variations.

2. The improvement of claim 1 further including a clock means for controlling the bit rate of said bit stream, and means for adjusting said clock means in response to said error signals to compensate for cycle-to-cycle scan velocity variations.

3. The improvement of claim 1 further including a memory for storing said errors signals, and means for serially reading said error signals out of said memory in timed synchronism with the rotation of said beam scanning mechanism to continuously adjust said bit rate during successive revolutions of said beam scanning mechanism.

4. The improvement of claim 3 wherein said error signals are digital signals, and said memory is a digital memory having separate address locations for storing said error signals.

5. The improvement of claim 4 further including another memory coupled to said source means for buffering said bit stream, a voltage controlled oscillator coupled to said other memory for supplying clock pulses to control the rate at which said bits are applied to said source means, addressing means coupled to said digital memory for cyclically reading said error signals out of said digital memory in series and in timed synchronism with the rotation of said beam scanning mechanism, and digital-to-analog converter means coupled between said digital memory and said voltage controlled oscillator for adjusting the rate of said clock pulses on a facet-by-facet basis for successive revolutions of said beam scanning mechanism.

6. The improvement of claim 5 wherein said beam scanning mechanism is a polygon scanner having a plurality of reflective surfaces for reflectively scanning said light beam across said recording medium.

* * * * *